US006959242B2

(12) United States Patent
Katoh et al.

(10) Patent No.: US 6,959,242 B2
(45) Date of Patent: Oct. 25, 2005

(54) ENGINE FUEL INJECTION CONTROL DEVICE

(75) Inventors: Hiroshi Katoh, Yokohama (JP); Ritsuo Sato, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/686,627

(22) Filed: Oct. 17, 2003

(65) Prior Publication Data

US 2004/0118385 A1 Jun. 24, 2004

(30) Foreign Application Priority Data

Dec. 20, 2002 (JP) ...................................... 2002-369838

(51) Int. Cl.[7] .................................................. B60T 7/12

(52) U.S. Cl. ......................... 701/104; 701/86; 701/102; 701/105; 701/110; 123/305; 123/494; 123/674

(58) Field of Search ........................... 701/86, 102–105, 701/110, 115; 123/305, 494, 674

(56) References Cited

U.S. PATENT DOCUMENTS 5,706,780 A * 1/1998 Shirakawa .................. 123/381
5,868,118 A * 2/1999 Yoshioka .................... 123/494
6,116,227 A * 9/2000 Yoshioka et al. ........... 123/674
6,192,307 B1 * 2/2001 Okamoto et al. ............. 701/70
6,292,730 B1 * 9/2001 Takizawa et al. ............. 701/51
6,401,703 B1 * 6/2002 Mamiya et al. ............. 123/674

FOREIGN PATENT DOCUMENTS

JP 11-173188 A 6/1999

* cited by examiner

*Primary Examiner*—Tony M. Argenbright
*Assistant Examiner*—Johnny H. Hoang
(74) *Attorney, Agent, or Firm*—Foley & Lardner LLP

(57) ABSTRACT

A spark ignition engine (2) has a fuel injector (8) in an intake port (7). An engine rotation speed sensor (9) detects the rotation speed of the engine (2). The controller (1) determines the target fuel injection amount of the fuel injector (8) during startup of the engine (2) by correcting the basic injection amount in response to the trend in the variation in the engine rotation speed. When the rotation speed of the engine (2) decreases, the controller (1) sets the target fuel injection amount to be smaller than when the rotation speed of the engine (2) is increasing at an identical rotation speed. As a result, effects on the air-fuel ratio related to wall flow relative to fluctuations in the rotation speed of the engine (2) are eliminated and the control accuracy of the air-fuel ratio of the engine (2) is improved.

17 Claims, 10 Drawing Sheets

4 AIR FLOW METER
8 FUEL INJECTOR
9 CRANK ANGLE SENSOR
11 CAM POSITION SENSOR
13 IGNITION SWITCH
14A IGNITION COIL
15 WATER TEMPERATURE SENSOR
16 OXYGEN SENSOR

4 AIR FLOW METER
8 FUEL INJECTOR
9 CRANK ANGLE SENSOR
11 CAM POSITION SENSOR

13 IGNITION SWITCH
14A IGNITION COIL
15 WATER TEMPERATURE SENSOR
16 OXYGEN SENSOR

+

ENGINE FUEL INJECTION CONTROL DEVICE

FIELD OF THE INVENTION

This invention relates to engine fuel injection control under transient operating conditions.

BACKGROUND OF THE INVENTION

JP 11-173188A published by the Japanese Patent Office in 1999 discloses a method of correcting the fuel supply amount during a startup period of an engine in response to the engine rotation speed. The startup period is defined as the period from initial combustion to complete combustion of the engine. Initial combustion is the first combustion after starting cranking of the engine with the starter motor. Complete combustion is a combustion state under which the engine rotates under its own power.

When the engine is started at a low temperature, the rotation speed is low due to the fact that friction creates high levels of resistance to rotation in the engine. The prior art technique achieves a preferred output torque by performing a correction to increase fuel supply when the rotation speed is low during the startup period.

SUMMARY OF THE INVENTION

When starting the engine, a portion of fuel injected during initial cranking forms a wall flow adhering to the intake valve or the wall face of the intake manifold. Consequently there is a time lag in the fuel supply to the fuel chamber due to the delay with which fuel in the wall flow reaches the combustion chamber when compared to fuel vapor flowing into the engine combustion chamber. As a result, there is a tendency for the air-fuel ratio of the gaseous mixture produced in the combustion chamber to be lean when the engine is accelerating.

The prior art technique increases the fuel supply the lower the rotation speed in order to take the wall flow amount into consideration when the rotation speed increases after initial combustion. However when the engine rotation speed decreases due to some cause during the startup period, there is a tendency for the air-fuel ratio of the gaseous mixture in the combustion chamber to be enriched by the inflow of fuel into the combustion chamber due to wall flow that was formed previously. If the increase correction of fuel supply depending on the rotation speed as described above is applied under these conditions, the gaseous mixture in the combustion chamber displays an excessively rich air-fuel ratio which increases fuel consumption and has an adverse effect on exhaust emission control.

When fuel is injected on each combustion cycle, the formation of wall flow results in a lean air fuel ratio on the initial cycle. In contrast, since the existing wall flow reaches the combustion chamber on the second and subsequent cycles, the decrease in the fuel supply attributable to wall flow is reduced. If this difference is not taken into account, it is not possible to perform accurate control of the air-fuel ratio of the gaseous mixture combusted on each cycle.

It is therefore an object of this invention to optimize air-fuel ratio control during the engine startup period.

In order to achieve the above object, this invention provides a fuel injection control device for a spark ignition engine having a fuel injector in an intake port, comprising an engine rotation speed sensor detecting an engine rotation speed, and a controller programmed to calculate a basic injection amount of fuel calculate a target fuel injection amount by correcting the basic fuel amount in response to the trend in variation of the engine rotation speed, and control a fuel injection amount of the fuel injector to the target fuel injection amount.

This invention also provides a fuel injection control method for a spark ignition engine having a fuel injector in an intake port. The method comprises determining an engine rotation speed, calculating a basic injection amount of fuel, calculating a target fuel injection amount by correcting the basic fuel amount in response to the trend in variation of the engine rotation speed, and controlling a fuel injection amount of the fuel injector to the target fuel injection amount.

The details as well as other features and advantages of this invention are set forth in the remainder of the specification and are shown in the accompanying drawings.

DESCRIPTION OF THE PREFERRED EMBODIMENTS

Figure 1:
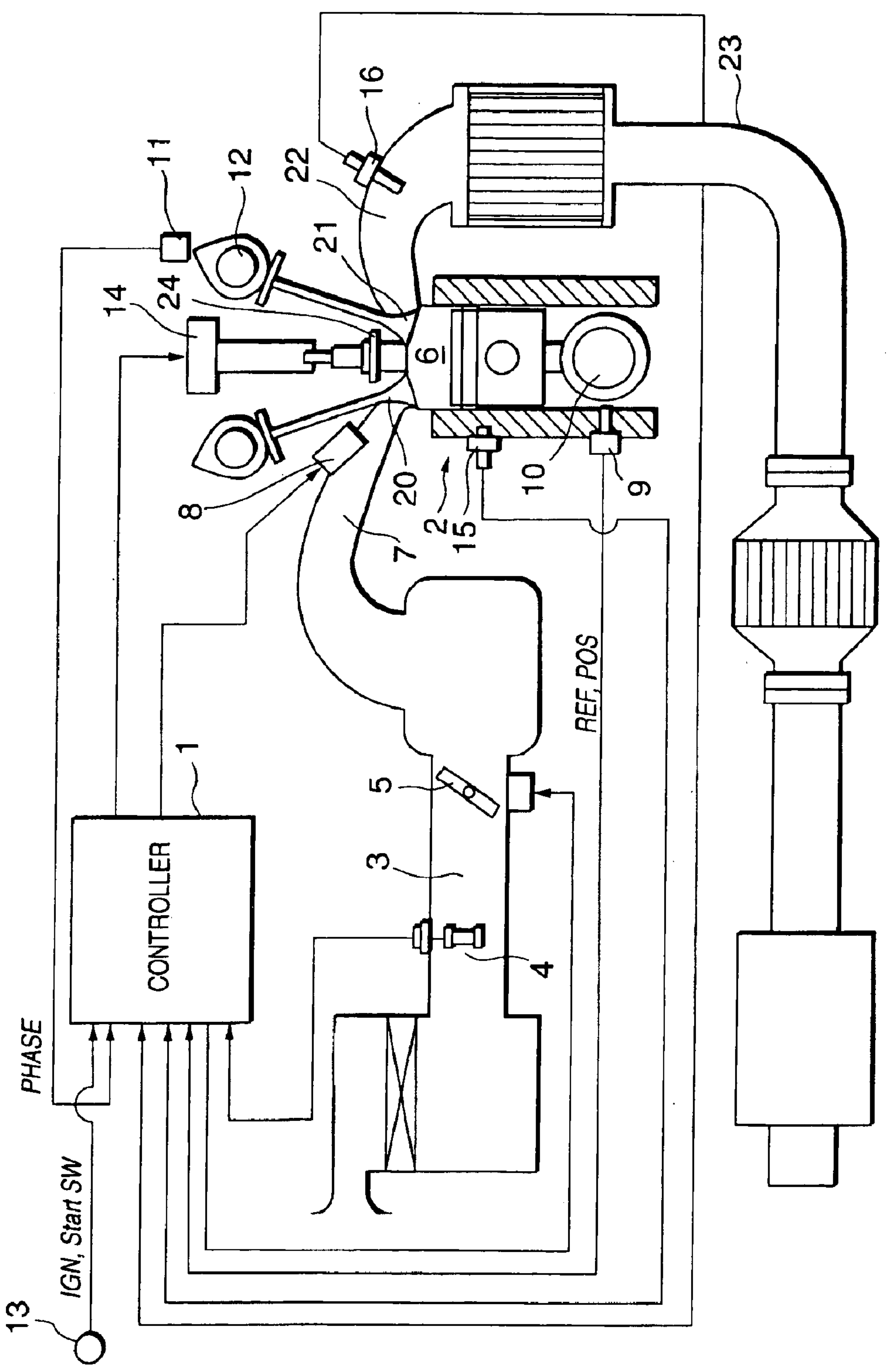
FIG. 1 is a schematic diagram of an engine to which this invention is applied.

Referring to FIG. 1 of the drawings, a four-stroke four-cylinder gasoline engine 2 to which this invention is applied comprises an intake pipe 3 connected to the combustion chamber 6 via an intake valve 20 provided in an intake port 7 and an exhaust pipe 23 connected to the combustion chamber 6 via an exhaust valve 21 provided in an exhaust port 22.

An electronic throttle 5 is provided in the intake pipe 3. A fuel injector 8 is provided in proximity to the intake valve 20 in the intake port 7. A fuel injector 8 is provided for each cylinder. Gasoline fuel is supplied at a fixed pressure to the fuel injector 8. When the fuel injector 8 is lifted, an amount of gasoline fuel which corresponds to the lift period is injected towards the intake air from the intake port 7. The injection timing and the fuel injection amount from each of the fuel injectors 8 is controlled by a pulse signal output from the controller 1 to each fuel injector 8. The fuel injector 8 initiates fuel injection simultaneously with the input of the pulse signal and injection is continuously performed during an interval equal to the pulse width of the pulse signal.

A gaseous mixture with a fixed air-fuel ratio is produced in the combustion chamber 6 of each cylinder as a result of the fuel injection from the fuel injector 8 and the intake air from the intake pipe 3. A spark plug 24 facing the combustion chamber 6 is sparked in response to a high-voltage current produced by an ignition coil 14 and ignites and burns the gaseous mixture in the combustion chamber 6.

The controller 1 comprises a microcomputer provided with a central processing unit (CPU), a read-only memory (ROM), a random access memory (RAM) and an input/output interface (I/O interface). The controller 1 may comprise a plurality of microcomputers.

A plurality of parameters related to fuel injection control are input into the controller 1. In other words, signals representing detection data are input to the controller 1 from an air flow meter 4 detecting the intake air amount in the engine 2, a crank angle sensor 9, a cam position sensor 11, an ignition switch 13, a water temperature sensor 15 detecting the cooling water temperature of the engine 2 and an oxygen sensor 16 detecting the oxygen concentration in the exhaust gas from the engine 2.

The crank angle sensor 9 outputs a REF signal when the crankshaft 10 of the engine 2 arrives at a reference rotation position. Furthermore a POS signal is output when the crankshaft 10 rotates through a unit angle which is set for example at one degree. The REF signal corresponds to the first speed signal and the POS signal corresponds to the second speed signal in the claims. The cam position sensor 11 outputs a PHASE signal in response a specific rotation position of the cam 12 driving the exhaust valve 21.

The ignition switch 13 is used to start the operation of the starter motor cranking the engine 2 on the basis of the output of a start signal. The ignition switch 13 also outputs an ignition signal to the ignition coil 14 at a fixed timing so as to cause the spark plug 24 to spark.

Figure 2:
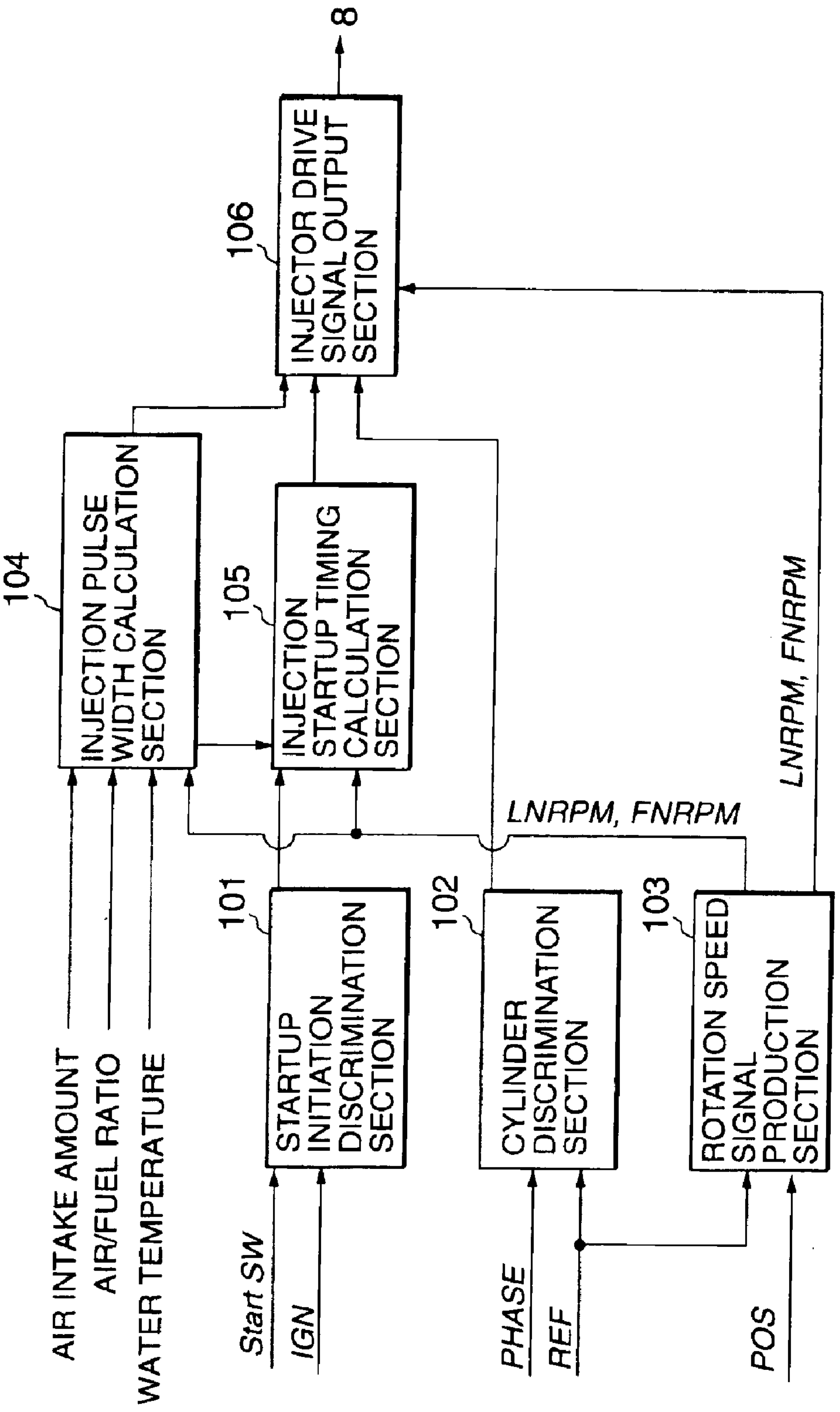
FIG. 2 is a block diagram showing the function of a controller according to this invention.

Referring to FIG. 2, the controller 1 comprises a startup initiation discrimination section 101, a cylinder discrimination section 102, a rotation speed signal production section 103, an injection pulse width calculation section 104, an injection startup timing calculation section 105 and an injector drive signal output section 106. These sections are virtual units representing the functions of the controller 1 and do not have physical existence.

The startup initiation discrimination section 101 detects startup of cranking of the engine 2 based on the start signal and the ignition signal from the ignition switch 13. Engine startup is determined when both the start signal and the ignition signal are in the ON position.

The cylinder discrimination section 102 uses the POS signal output by the crank angle sensor 9 and the PHASE signal output by the cam position sensor 11 in order to determine the respective stroke positions of the four cylinders #1–#4 of the engine 2. In the description hereafter, this determination is termed cylinder discrimination. As shown in FIGS. 10A–10I, the stroke positions of the four-stroke engine comprise an intake stroke, a compression stroke, an expansion stroke and an exhaust stroke.

The rotation speed production section 103 calculates the engine rotation speed LNRPM based on the output interval of the REF signal from the crank angle sensor 9. The rotation speed production section 103 also calculates the engine rotation speed FNRPM based on the output interval of the POS signal from the crank angle sensor 9.

During normal operation of the engine 2, the injection pulse width calculation section 104 calculates the basic fuel injection pulse width by looking up a pre-stored map based on the engine rotation speed calculated by the rotation speed signal production section 103 and the air intake amount detected by the air flow meter 4. The injection pulse width calculation section 104 determines the injection pulse width by applying a correction to the basic fuel injection pulse width so that the gaseous mixture in the combustion chamber 6 coincides with a fixed target air-fuel ratio. The fuel correction amount is calculated based on the oxygen concentration in the exhaust gas detected by the oxygen sensor 16 and the cooling water temperature detected by the water temperature sensor 15.

During engine startup, the injection pulse width calculation section 104 determines the fuel injection pulse width using a method described hereafter which differs from the method for normal operating states.

The injection initiation timing calculation section 105 calculates the initial timing of the fuel injection based on the injection pulse width and the engine rotation speed.

The injector drive signal output section 106 outputs a pulse signal to the fuel injector 8. The pulse signal is determined based on the injection pulse width and the startup timing for fuel injection.

Next referring to FIG. 3, a startup fuel injection control routine performed by the controller 1 having the above structure when starting the engine 2 will be described. This routine is executed at an interval of ten milliseconds irrespective of whether the engine 2 is operating or not.

Firstly in a step S1, the controller 1 determines whether or not the ignition signal is ON. When the ignition signal is not ON, the routine is immediately terminated. Consequently operation of this routine is substantially limited to periods in which the ignition signal is ON.

When the ignition signal is ON, in a step S2, the controller 7 determines the fuel injection pattern during startup based on the cooling water temperature. Normal fuel injection of the engine 2 is performed by sequential injection into each cylinder. In the step S2, a specific injection timing is set for startup in response to the cooling water temperature.

Referring to FIGS. 10A–10I, the startup fuel injection pattern will be described in detail. Apart from hot restart when the engine 2 is completely warmed up, when the first REF signal is detected before cylinder discrimination, this engine 2 performs a pilot injection using a fixed amount of fuel into all cylinders. The purpose of the pilot injection is to pre-form wall flow conditions. After the pilot injection, cylinder discrimination is performed for the first time and sequential fuel injection is performed. The expression "initial fuel injection" used in the description below refers to fuel injection executed for the first time after the initial cylinder discrimination and does not include the pilot injection.

The pattern of fuel injection into each cylinder differs depending on the cooling water temperature.

Figures 10A, 10B, 10C, 10D, 10E, 10F, 10G, 10H, 10I:
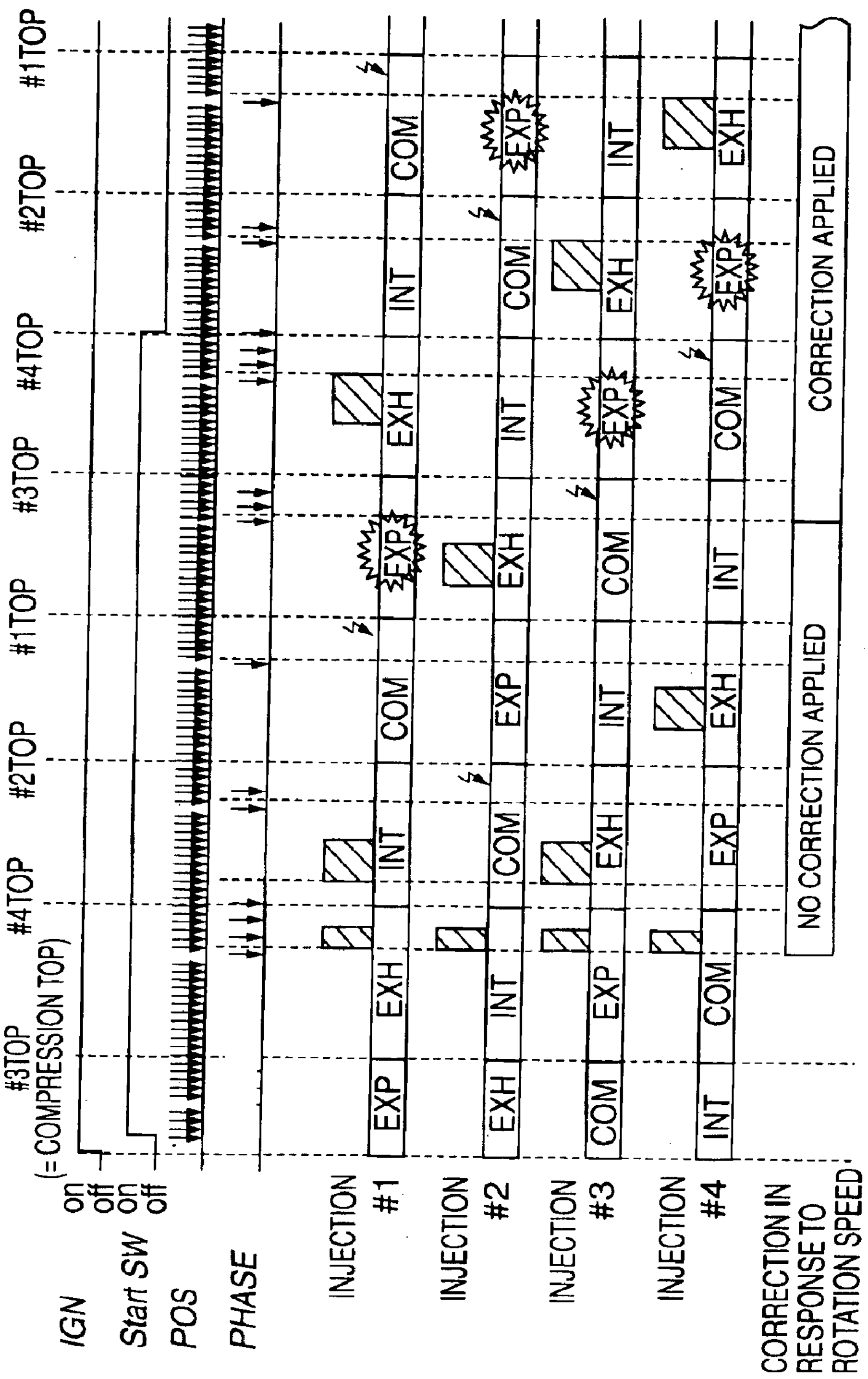
FIGS. 10A–10I are timing charts showing the fuel injection pattern during startup executed by the controller at normal water temperature according to the first and the second embodiments of this invention.

As shown in FIGS. 10E and 10G, when the cooling water temperature is greater than or equal to a predetermined temperature, fuel injection is performed in the cylinder undergoing the first exhaust stroke and the cylinder undergoing the first intake stroke. Thereafter sequential injection is performed on the exhaust stroke of each cylinder.

When the cooling water temperature is less than the predetermined temperature, sequential injection is performed on the intake stroke of each cylinder.

Thus in the step S2, the controller 1 selects one of two injection patterns based on the cooling water temperature.

In a step S3, the controller 1 determines whether or not the start signal is ON. When the start signal is not ON, the controller 1 terminates the routine without proceeding to subsequent steps. Thereafter fuel injection control for normal operation as outlined above is performed. Normal operation control is performed on the basis of a separate routine. This routine determines the period in which the start signal is ON as the startup state of the engine 2.

When the start signal is ON, the controller 1 performs the processing of a step S4 and subsequent steps. In this routine, fuel injection is only performed when the processing of these steps is performed. In this case, the injection pattern selected in the step S2 is used.

In the step S4, the controller 1 determines whether or not an initial fuel injection has been performed with respect to the cylinders #1–#4. As described above, the initial fuel injection does not include the pilot injection.

With respect to the cylinder for which the determination result in the step S4 is affirmative, in a next step S5, the controller 1 determines not to apply a correction on the basis of the engine rotation speed to the fuel injection amount. In this case, a pre-set amount of fuel is used as a target fuel injection amount for the initial fuel injection. After the process in the step S5, the controller 1 terminates the routine.

With respect to the cylinder for which the determination result in the step S4 is negative, the controller 1 determines to applies a correction on the basis of the engine rotation speed to the fuel injection amount in a step S6.

Then in a step S7, the target fuel injection amount with an added correction for the engine rotation speed is calculated. After the process in the step S7, the controller 1 terminates the routine.

Next the calculation of the target fuel injection amount performed in the step S7 will be described.

In the step S7, the target fuel injection pulse width TIST is calculated by adding the fuel correction in Equation (1) below to the basic fuel injection pulse width.

$$TIST=TST\cdot MKINJ\cdot KNST\cdot KTST\cdot TATTM \tag{1}$$

where, TST=basic fuel injection pulse width,

MKINJ=correction factor in response to battery voltage,

KNST=correction factor in response to engine rotation speed,

KTST=correction factor based on fuel vaporization characteristics, and

TATTM=correction factor based on air mass variation.

The correction factor KTST based on the fuel vaporization characteristics in Equation (1) is a correction factor for correcting variations in the vaporization characteristics of fuel injected by the fuel injector 8 as a result of temperature variation in the intake valve 20 as time elapses after cranking startup. The correction factor TATTM based on air mass variation is a correction factor for correcting variations in the air mass due to atmospheric pressure variation.

The correction factor KNST corresponding to the engine rotation speed in Equation (1) will be described hereafter.

The correction factor KNST corresponding to the engine rotation speed comprises the intake negative pressure correction factor and the wall flow correction factor.

The intake negative pressure correction factor is a correction factor which compensates for the difficulty in developing an intake negative pressure downstream of the throttle 5 when the engine rotation speed is low. The intake negative pressure is dominant in promoting vaporization of injected fuel.

The wall flow correction factor is a correction factor for correcting the, inflow delay into the combustion chamber resulting from that portion of fuel injected during startup of the engine 2 which forms wall flow. Either correction factor increases as the engine rotation speed decreases. The wall flow correction factor takes a value of zero when the engine rotation speed increases to a certain level.

When the correction factor KNST is determined on the basis of the above characteristics, even when the engine rotation speed decreases for some reason during startup, a correction factor KNST is applied which is equal to that used when the rotation speed is increasing at that value. There is the tendency for wall flow as described above to enrich the air-fuel ratio of the gaseous mixture in the combustion chamber during acceleration and to make the air-fuel ratio lean during deceleration.

Thus when the correction factor KNST for acceleration is used in the calculation of the fuel injection pulse width during deceleration, the gaseous mixture in the combustion chamber undergoes an excessive enrichment. When the air-fuel ratio is excessively enriched, ignition failure may result in further decreases in the engine rotation speed. As a result, there is the possibility that the increase in the correction factor KNST will cause a further cycle of enrichment.

In order to prevent this consequence, the controller 1 applies the method below to the calculation in Equation (1) so that the air-fuel ratio is maintained to a suitable level even when the engine rotation speed falls during startup.

The engine rotation speed which is used as a parameter for setting the correction factor KNST may be represented by a rotation speed FNRPM based on the POS signal or a rotation speed LNRPM based on the REF signal. In the following description, the former is referred to as a POS signal rotation speed whereas the latter is referred to as a REF signal rotation speed.

When the engine 2 is operating normally, these values are equal. However during acceleration or deceleration, the POS signal rotation speed FNRPM based on the POS signal which has a high detection frequency takes a different value from the REF signal rotation speed LNRPM which is based on the REF signal which has a low detection frequency. In other words, during engine acceleration, the POS signal rotation speed FNRPM takes a larger value than the REF signal rotation speed LNRPM. During engine deceleration, the REF signal rotation speed LNRPM takes a larger value than the POS signal rotation speed FNRPM.

FIGS. 5A–5F show the difference between determining the correction factor KNST based on the POS signal rotation speed FNRPM and determining the correction factor KNST based on the REF signal rotation speed LNRPM. "IGN" in FIG. 5A denotes the ignition signal, and "Start SW" in FIG. 5B denotes the start signal. The broken vertical line in the timing chart shows the execution interval of the routine.

Figures 5A, 5B, 5C, 5D, 5E, 5F:
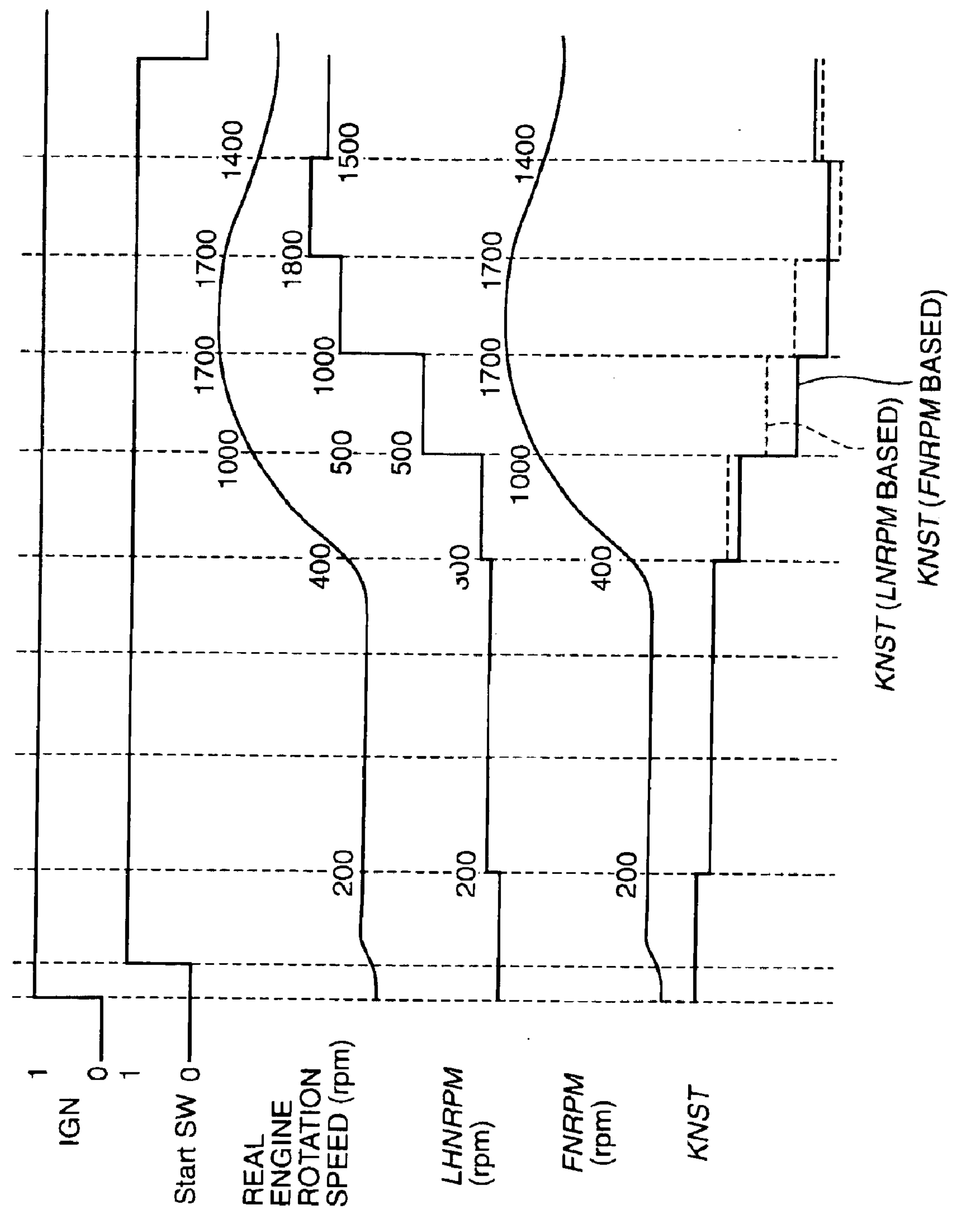
FIGS. 5A–5F are timing charts for explaining the effect on control of the difference in the methods of correcting the fuel injection amount.

The POS signal rotation speed FNRPM shown in FIG. 5E is updated in real time so as to follow the variation in the real engine rotation speed shown in FIG. 5B in an accurate manner. This is achieved by frequently detecting the POS signal. There is a time lag in updating the REF signal rotation speed LNRPM shown in FIG. 5D due to its dependency on the REF signal which has a low detection frequency. As a result, during engine acceleration, LNRPM is lower that the real engine rotation speed and during deceleration it is higher than the real engine rotation speed.

The correction factor KNST decreases as the engine speed increases. As a result, the value for the correction factor KNST which is based on the POS signal rotation speed FNRPM shown by the solid line in FIG. 5F falls below the value for the correction factor KNST based on the REF signal rotation speed LNRPM shown by the broken line in the figure. Conversely during deceleration, the value for the correction factor KNST which is based on the POS signal rotation speed FNRPM exceeds the value for the correction factor KNST based on the REF signal rotation speed LNRPM.

The controller 1 uses these characteristics in order to set the correction factor KNST using both the POS signal rotation speed FNRPM and the REF signal rotation speed LNRPM by using Equation (2) below.

$$KNST=KNTS1+\mathrm{KNSTHOS} \quad (2)$$

where, KNST1=correction factor in response to rotation speed FNRPM based on POS signal,

KNSTHOS=DLTNEGA#. (FNRPM−LNRPM),

DLTNEGA#=positive constant, and

LNRPM=rotation speed based on REF signal.

The correction factor KNSTHOS corresponds to the first correction amount and the correction factor KNST1 corresponds to the second correction amount in the claims. According to Equation (2), the correction factor KNST is set as a value calculated by adding a correction factor KNSTHOS to the correction factor KNST1 based on the POS signal rotation speed FNRPM. The correction factor KNSTHOS is calculated from the difference of the REF signal rotation speed LNRPM and the POS signal rotation speed FNRPM.

Figure 4:
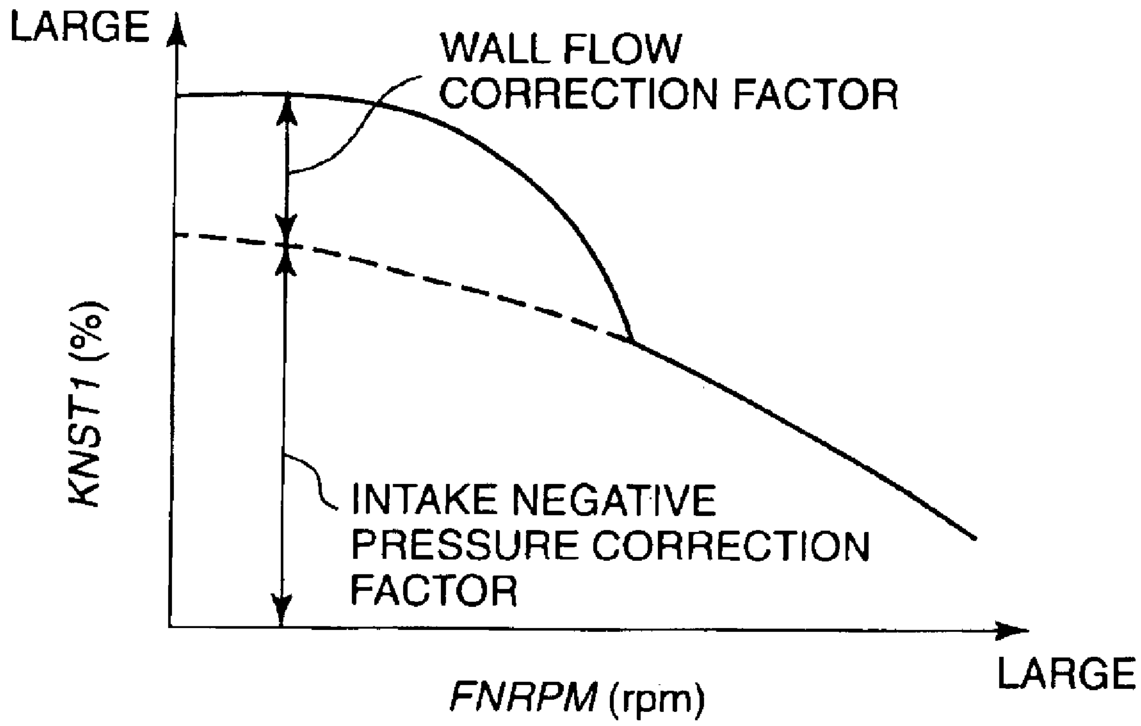
FIG. 4 is a diagram showing the relationship between an engine rotation speed and an injection pulse width increase ratio KNST1 during engine startup according to this invention.

The correction factor KNST1 is calculated according to the POS signal rotation speed FNRPM by looking up a map having the characteristics shown in FIG. 4 which is pre-stored in the memory (ROM) of the controller 1. These characteristics are basically the same as the characteristics for the correction factor KNST described above. A value which corresponds to adding the wall flow correction factor to the intake negative pressure correction factor is applied as the correction factor KNST1.

On the other hand, the correction factor KNSTHOS during engine acceleration is a positive value due to the fact that the POS signal rotation speed FNRPM is greater than the REF signal rotation speed LNRPM. Thus the correction factor KNST is a value greater than the correction factor KNST1. Conversely during engine deceleration, the correction factor KNSTHOS is a negative value due to the fact that the POS signal rotation speed FNRPM is smaller than the REF signal rotation speed LNRPM. Consequently under those conditions, the correction factor KNST is a value smaller than the correction factor KNST1. In other words, the correction factor KNST during engine deceleration is smaller than the correction factor KNST during acceleration with respect to the same engine rotation speed.

Figures 6A, 6B, 6C, 6D, 6E, 6F:
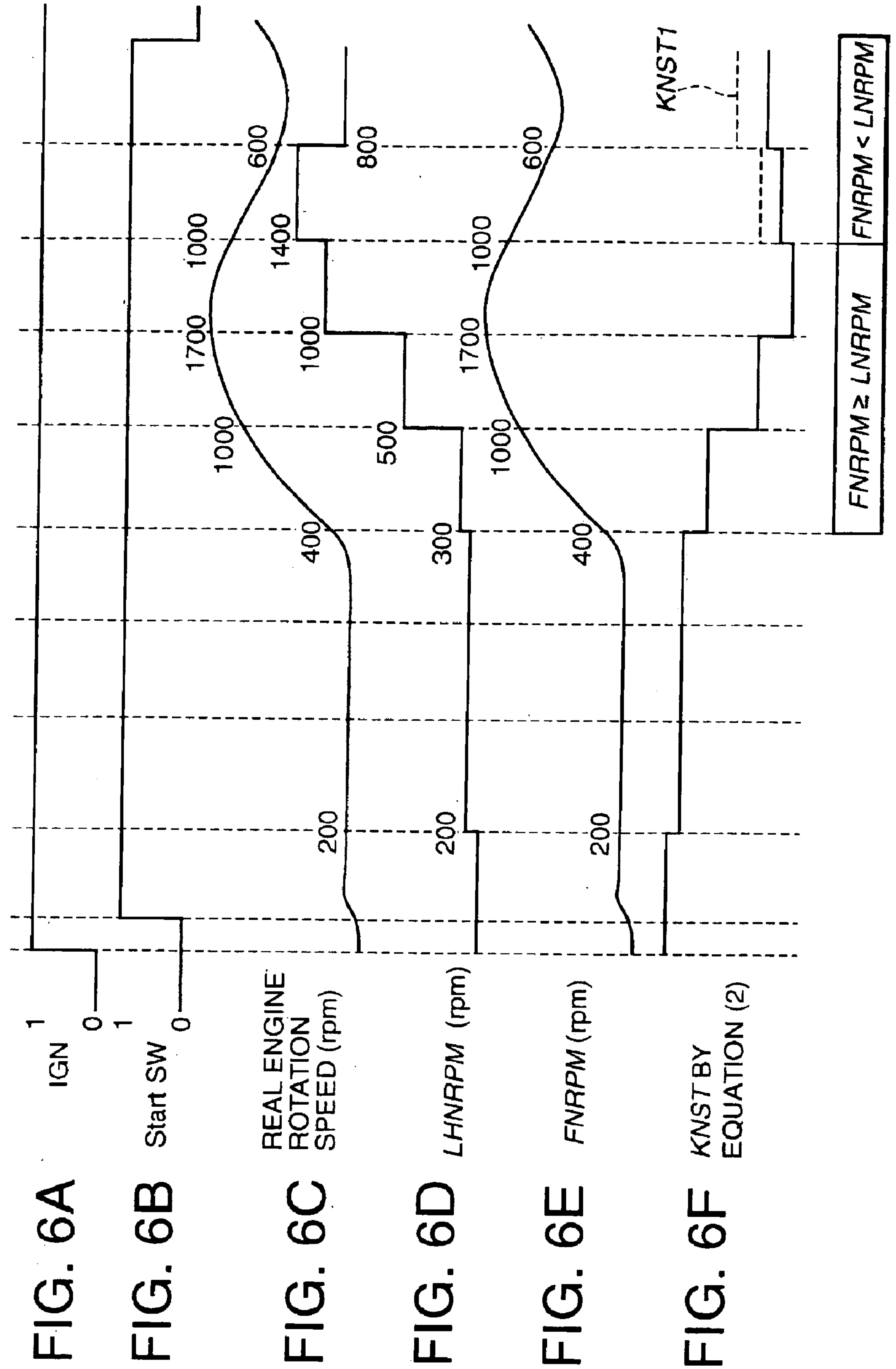
FIGS. 6A–6F are timing charts showing the effect of fuel injection control according to this invention.

FIGS. 6A–6F show the variation in the correction factor KNST calculated using Equation (2). As shown by the solid line in FIG. 6F while the engine 2 is accelerating, the correction factor KNST takes large values. Even at the same rotation speed, when the engine 2 is decelerating, the correction factor KNST takes small values. The broken line in FIG. 6F shows the value corresponding to setting the correction factor KNST to equal the correction factor KNST1.

As described above, this invention adds a correction such that the fuel injection amount when the rotation speed decreases during engine startup is smaller than the fuel injection amount when the rotation speed increases from cranking. Thus even when the rotation speed decreases after starting the engine 2, the air-fuel ratio of the gaseous mixture is maintained to a suitable range centering on the stoichiometric air-fuel ratio, and the gaseous mixture promoted in the engine 2 is prevented from becoming excessively rich.

Next referring to FIG. 7, a second embodiment of this invention will be described. In this embodiment, the controller 1 executes the subroutine shown in FIG. 7 instead of calculating the fuel injection pulse width TIST using Equations (1) and (2) in the step S7 of FIG. 3. The process in other steps in the routine shown in FIG. 3 is the same as the steps in the first embodiment.

Figure 7:
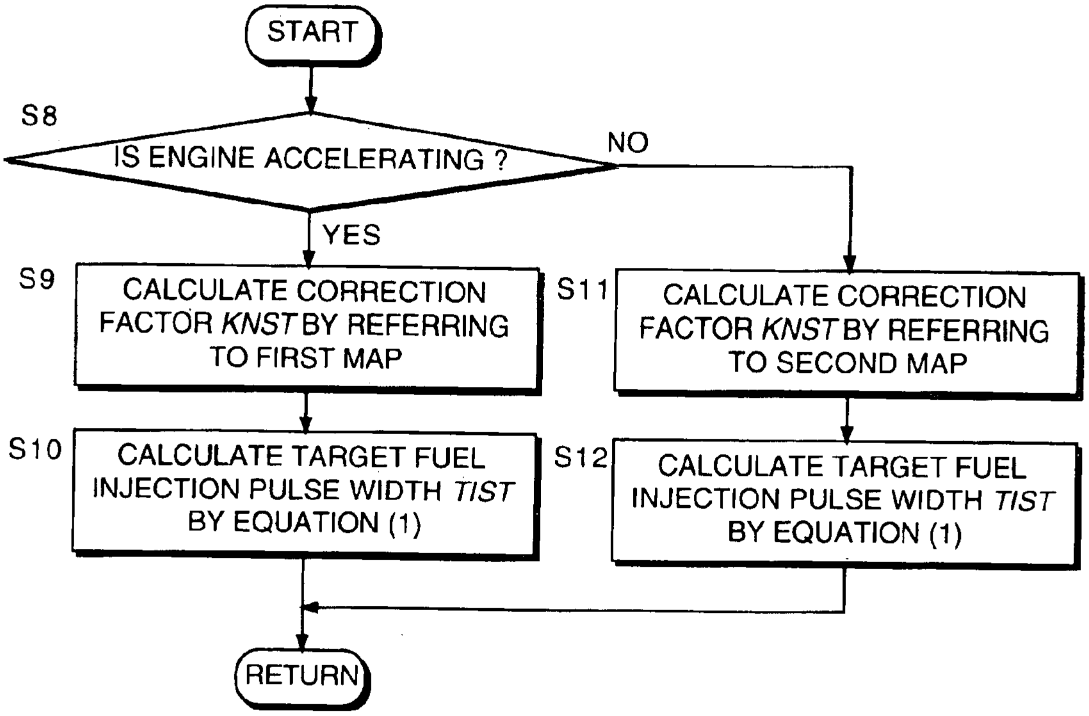
FIG. 7 is a flowchart showing a subroutine for switching the correction map executed by the controller according to a second embodiment of this invention.

Referring to FIG. 7, firstly in a step S8, the controller 1 determines whether or not the engine 2 is accelerating. This determination is performed based on the variation in the input interval of the POS signal.

Figure 8A:
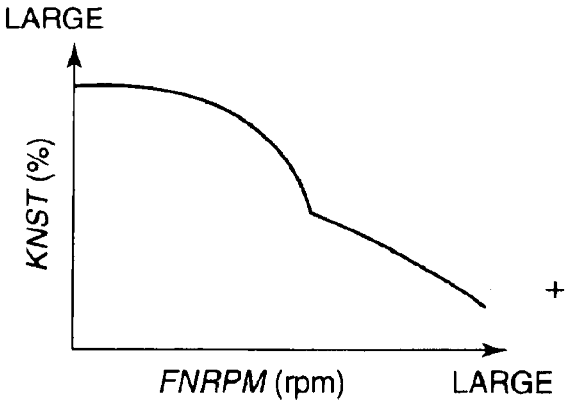
FIGS. 8A–8C are diagrams showing the characteristics of the correction map stored in the controller according to the second embodiment of the invention.
Figure 8B:
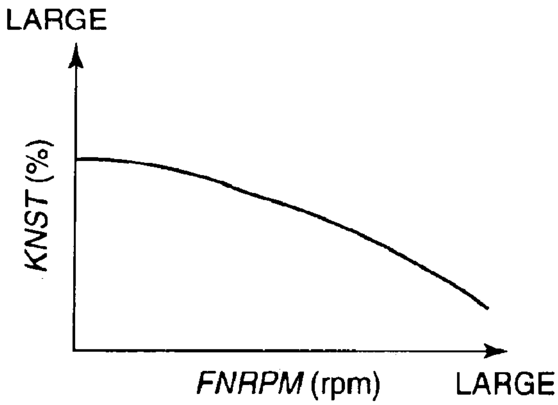
Figure 8C:
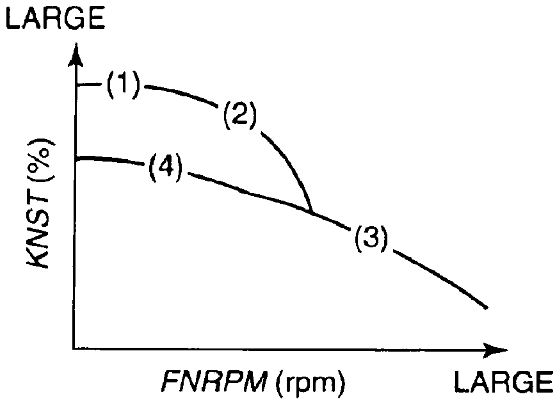

When the engine 2 is accelerating, in a step S9, the controller 1 calculates a correction factor KNST in response to the engine rotation speed based on the POS signal rotation speed FNRPM by looking up a first map having the characteristics shown in FIG. 8A which is pre-stored in the memory (ROM). The curved line in FIG. 8A corresponds to the curved line (1)–(2)–(3) adding the wall flow correction to the intake air negative pressure correction (3)–(4) in FIG. 8C. As shown in FIGS. 8A–8C, when the engine rotation speed FNRPM is less than a fixed speed, the first map applies a correction factor KNST which is larger than that in a second map which is shown in FIG. 8B. However when the engine rotation speed FNRPM is greater than or equal to the fixed speed, the two maps are set so that the same increase correction is applied.

In a next step S10, a fuel injection pulse width TIST is calculated by Equation (1) applying the correction factor KNST obtained from the first map.

However in the step S8, when it is determined that the engine 2 is not accelerating, in a step S11, the controller 1 uses the POS signal rotation speed FNRPM to calculate the correction factor KNST corresponding to the engine rotation speed by looking up the second map which has the characteristics shown in FIG. 8B. This map is also pre-stored in the memory (ROM). The curved line in FIG. 8B corresponds to the curved line 3)–(4) in FIG. 8C for the intake air negative pressure correction.

In a next step S12, the fuel injection pulse width TIST is calculated by Equation (1) applying the correction factor KNST obtained from the second map.

After the process in the step S9 or the step S12, the controller 1 terminates the routine.

FIGS. 9A–9F show the results of control according to this embodiment.

Figures 9A, 9B, 9C, 9D, 9E, 9F:
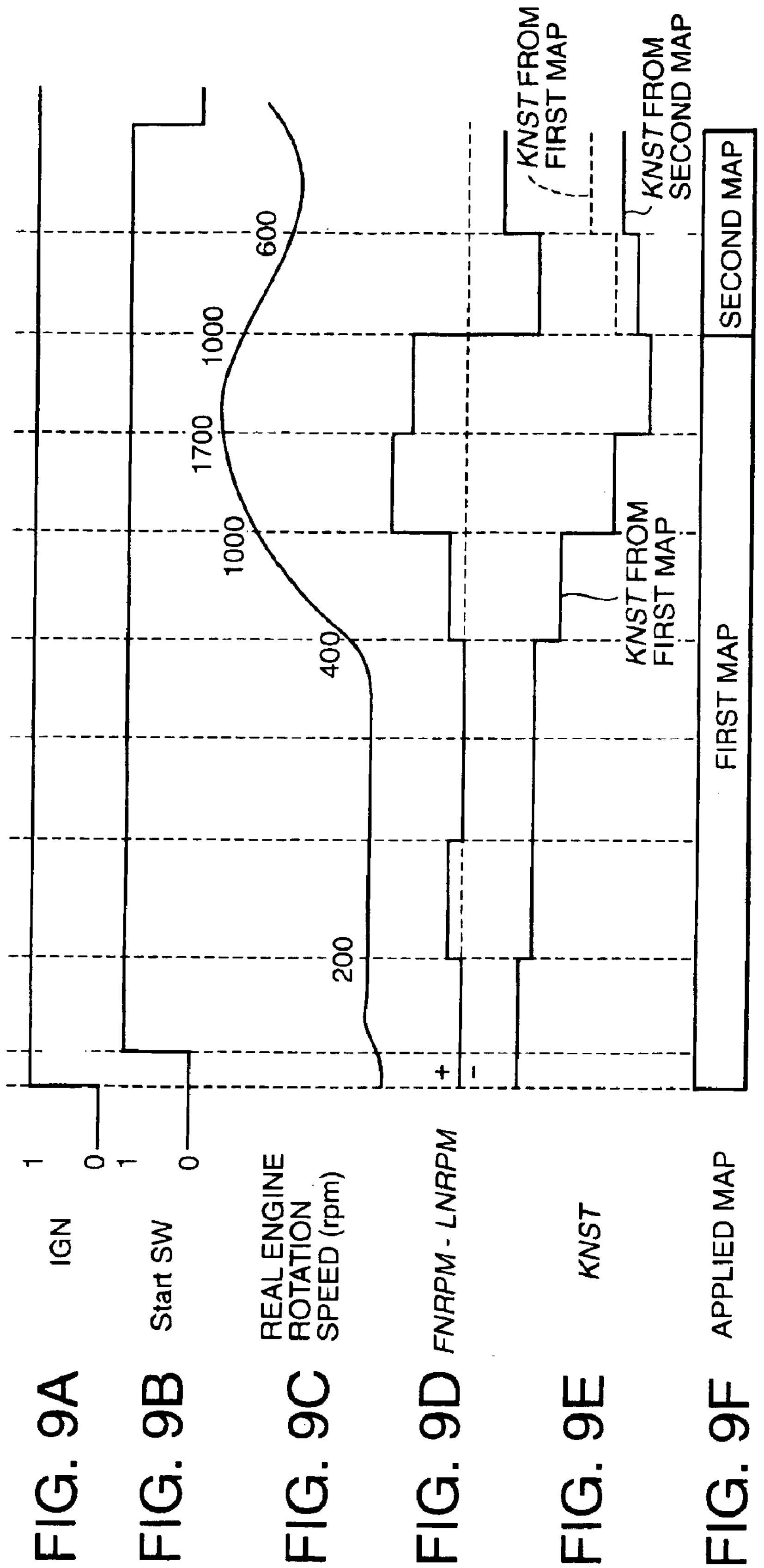
FIGS. 9A–9F are timing charts showing the effect on control of the switching of the correction map.

As shown in FIG. 9B, while the engine rotation speed is increasing from zero after starting cranking, the controller 1 calculates the correction factor KNST using the first map containing the wall flow correction factor as shown in FIG. 9F. When a decrease in the engine rotation speed is detected while the engine 2 is starting, instead of the first map, the controller 1 calculates the correction factor KNST using the second map which does not contain the wall flow correction factor.

The correction factor KNST calculated in this manner is shown by the solid line in FIG. 9F. On the other hand, the correction factor KNST calculated only using the first map is shown by the broken line in FIG. 9F. As shown in the figure, this embodiment also prevents the adverse result that the fuel injection amount undergoes an excessive increasing correction when the engine 2 is decelerating.

Figure 3:
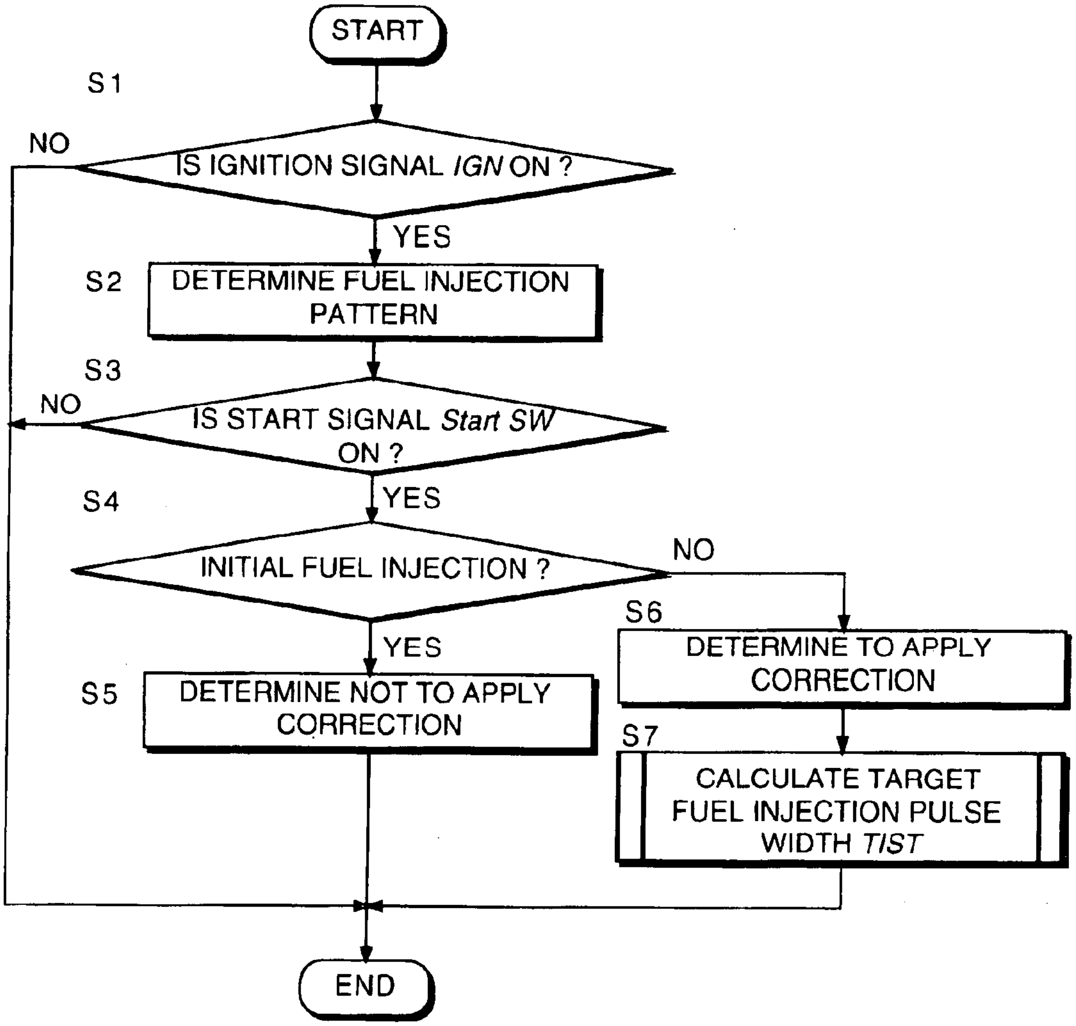
FIG. 3 is a flowchart showing a fuel injection control routine during engine startup executed by the controller.

In the step S4 and S5 in FIG. 3, the injection amount at the initial fuel injection for each cylinder is fixed and the correction is not based on the engine rotation speed. The reason for this is as follows.

Generally when the fuel is firstly injected into the intake port 7, since wall flow is zero, most of the injected fuel becomes wall flow. Consequently when the injected amount is calculated by the same method as the injected amount for other fuel injection operations, there is a large deviation from the actually required fuel injection amount.

Therefore a fuel injection pattern is set in which a pilot injection is performed in all cylinders in order to pre-form a wall flow. Thereafter the initial fuel injection is performed in each cylinder. As a result, the formation process of the wall flow depends on the timing of the injection. This results in a difference between the initial fuel injection and fuel injection operations thereafter. Consequently the calculation of the injection amount for the initial fuel injection does not use the calculation method for the fuel injection amount during subsequent fuel injections. The calculation is adapted to avoid a deviation from the actually required fuel injection amount by using a fixed amount which is determined beforehand on the basis of experiment.

As stated above, since this invention determines the fuel injection amount of the engine 2 at start up in response to the rotation speed of the engine 2 and the trend in the variation in the rotation speed, it is possible to control the air-fuel ratio at engine startup in a suitable manner.

The contents of Tokugan 2002-369838, with a filing date of Dec. 20, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the step S3 in FIG. 3, when the start signal is ON, it is determined that the engine 2 is starting up. However other methods may be used in order to determine whether the engine 2 is being started. For example, it is possible to regard a fixed period after starting cranking as the startup state of the engine 2. Alternatively it is possible to regard the period until the rotation speed of the engine reaches a pre-set fixed speed such as the target idling rotation speed as the startup state of the engine 2. This invention can be applied without reference to a determination method or a detection method for the startup state.

In each of the above embodiments, the parameters required for control are detected using sensors, but this invention can be applied to any fuel injection control device which can perform the claimed control using the claimed parameters regardless of how the parameters are acquired.

What is claimed is:

1. A fuel injection control device for a spark ignition engine having a fuel injector in an intake port, comprising:

an engine rotation speed sensor detecting an engine rotation speed; and a programmable controller programmed to:

calculate a basic injection amount of fuel;

calculate a target fuel injection amount by correcting the basic fuel amount in response to the trend in variation of the engine rotation speed such that a larger target fuel injection amount is given when the engine rotation speed increases than when the engine rotation speed decreases for an identical engine rotation speed; and control a fuel injection amount of the fuel injector to the target fuel injection amount.

2. The fuel injection control device as defined in claim 1, wherein the controller is further programmed to determine whether or not the engine is in a startup state, and when the engine is not in a startup state, to prevent the basic fuel amount from being corrected in response to the trend in variation of the engine rotation speed.

3. The fuel injection control device as defined in claim 2, wherein the engine is an engine for driving a vehicle which comprises a starter switch for cranking the engine, and the controller is further programmed to determine that the engine is in the startup state when the starter switch is ON.

4. The fuel injection control device as defined in claim 2, wherein the controller is further programmed to set the target fuel injection amount to a fixed value when the fuel injector performs fuel injection for the first time in the startup state.

5. The fuel injection control device as defined in claim 1, wherein the engine rotation speed sensor comprises a sensor outputting a first speed signal and a second speed signal which is updated less frequently than the first speed signal and the controller is further programmed to determine whether or not the engine rotation speed is increasing based on variation in the first speed signal.

6. The fuel injection control device as defined in claim 5, wherein the engine rotation speed sensor comprises a crank angle sensor which detects variation in a crank angle of the engine and the first signal comprises a signal corresponding to a unit crank angle and the second signal comprises a signal corresponding to a predetermined crank angle.

7. The fuel injection control device as defined in claim 5, wherein the controller is further programmed to calculate the target fuel injection amount by correcting the basic injection amount using a first correction amount based on the difference between the engine rotation speed calculated from the first signal and the engine rotation speed calculated from the second signal.

8. The fuel injection control device as defined in claim 7, wherein the first correction amount increases the basic fuel injection amount when the engine rotation speed calculated from the first speed signal is greater than the engine rotation speed calculated from the second speed signal, and decreases the basic fuel injection amount when the engine rotation speed calculated from the first speed signal is smaller than the engine rotation speed calculated from the second speed signal.

9. The fuel injection control device as defined in claim 8, wherein the absolute value of the first correction amount is set to increase as the difference of the engine rotation speed calculated from the first speed signal and the engine rotation speed calculated from the second speed signal increases.

10. The fuel injection control device as defined in claim 7, wherein the controller is further programmed to calculate the target fuel injection amount by correcting the basic fuel injection amount using both the first correction amount and a second correction amount which increases as the engine rotation speed calculated from the first speed signal decreases.

11. The fuel injection control device as defined in claim 5, wherein the controller stores a first map and a second map for calculating an increase correction amount, the first map giving a larger increase correction amount than the second map, and is further programmed to calculate the increase correction amount by selective applying the first map and the second map in response to the trend in the variation in the engine rotation speed.

12. The fuel injection control device as defined in claim 11, wherein the first map and the second map are set to give an identical increase correction amount when the engine rotation speed is not less than a predetermined speed.

13. The fuel injection control device as defined in claim 11, wherein the first map and the second map are both set to increase the increase correction amount as the engine rotation speed decreases.

14. The fuel injection control device as defined in claim 1, wherein the engine comprises a plurality of cylinders having a combustion cycle offset from each other, each of the cylinders comprising an intake port and a fuel injector, and the controller is further programmed to calculate the target fuel injection amount for each cylinder in response to the combustion cycle.

15. The fuel injection control device as defined in claim 1, wherein the fuel injection control device further comprises a sensor which detects an intake air amount of the engine, and the controller is further programmed to set the basic injection amount based on the intake air amount.

16. A fuel injection control device for a spark ignition engine having a fuel injector in an intake port, comprising:

means for determining an engine rotation speed;

means for calculating a basic injection amount of fuel;

means for calculating a target fuel injection amount by correcting the basic fuel amount in response to the trend in variation of the engine rotation speed such that a larger target fuel injection amount is given when the engine rotation speed increases than when the engine rotation speed decreases for an identical engine rotation speed; and means for controlling a fuel injection amount of the fuel injector to the target fuel injection amount.

17. A fuel injection control method for a spark ignition engine having a fuel injector in an intake port, comprising:

determining an engine rotation speed;

calculating a basic injection amount of fuel;

calculating a target fuel injection amount by correcting the basic fuel amount in response to the trend in variation of the engine rotation speed such that a larger target fuel injection amount is given when the engine rotation speed increases than when the engine rotation speed decreases for an identical engine rotation speed; and controlling a fuel injection amount of the fuel injector to the target fuel injection amount.

* * * * *